United States Patent Office 3,445,417
Patented May 20, 1969

3,445,417
CONTROLLED RELEASE AGENTS
Douglas K. Layne, Hal J. Northrup, and Carl D. Weber, Midland, Mich., assignors to Dow Corning Corporation, Midland, Mich., a corporation of Michigan
No Drawing. Filed Aug. 4, 1965, Ser. No. 477,304
Int. Cl. C08g 47/06, 51/28, 51/30
U.S. Cl. 260—33.6                                    5 Claims

ABSTRACT OF THE DISCLOSURE

A controllable-release capability can be achieved by certain organopolysiloxane gums, silica and dispersing agent. By controlling the amount of phenyl groups in the organopolysiloxane a sequence of release agents can be formulated having varying release capabilities.

---

This application relates to release agents for cellulosic materials that have intermediate-range release properties.

Cured dimethylpolysiloxane gums, such as those described in U.S. Patent 3,061,567, are effective and well-known release agents for such uses as preventing asphalt from adhering to the paper container in which it is packed without migration of the silicone from the paper to the asphalt.

In many uses, however, it is possible for the release capability of a substrate to be too great. For example, pull-away backings for adhesive tapes must separate without difficulty from the adhesive that they protect, but they must not contain such effective release agents that they accidentally fall off or slide away. Such occurrences are possible with the presently-known silicone release agents.

An object of this invention is to provide silicone release agents with release capabilities that are less effective than the presently-known silicone release agents and to provide a sequence of release agents that have varying release capabilities, so that a release agent having precisely the desired release capability for most situations can be obtained. Another object is to provide release films in which the release capability is essentially constant with time.

The release agents of this invention provide intermediate range release values, effectively eliminating the disadvantage cited above, while still providing easy release.

To illustrate, when a 1 inch wide strip of adhesive tape is affixed to stiff paper treated with the release agent of U.S. Patent 3,061,567, a pull of 5 to 20 grams parallel to the plane of the paper so as to pull the tape backwards off of the paper will remove the tape. This test is the Technical Association for the Pulp and Paper Industry Routine Control Test No. 283, known as the Keil test.

When the same experiment is repeated using the release agent of this invention, a pull of from 25 to 150 grams is required.

For untreated paper, a pull of well over 500 grams is required.

This application relates to an intermediate-range release agent consisting essentially of a mixture of:

(a) 100 parts by weight of a curable organopolysiloxane consisting essentially of units of the formula $$R_nSiO_{\frac{4-n}{2}}$$

where R is selected from the group consisting of phenyl and methyl, and $n$ has an average value of 1.9 to 2.0, from 80 to 97 mol percent of said R groups being methyl, (b) from 0 to 4 parts by weight of finely-divided silica, and (c) from 100 to 2,000 parts by weight of a dispersing agent.

By "curable organopolysiloxane" is meant one or a mixture of more than one uncrosslinked, solvent-soluble silicone polymer which is curable to a solvent-insoluble elastomer or resin. Any system of curing can be used in this invention; for example, any of the following polymers and curing agents are suitable for this invention:

(a) 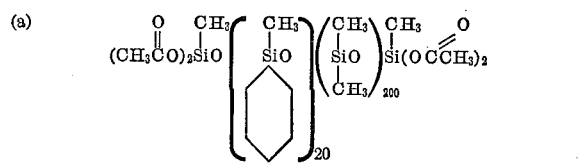

which cures on exposure to moisture.

(b) 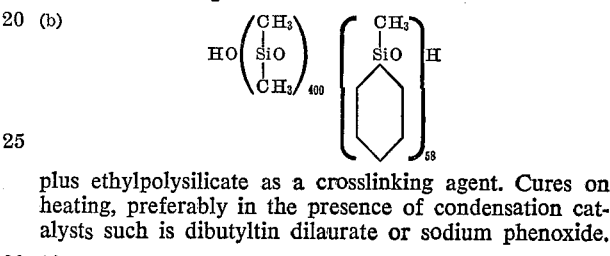

plus ethylpolysilicate as a crosslinking agent. Cures on heating, preferably in the presence of condensation catalysts such is dibutyltin dilaurate or sodium phenoxide.

(c) 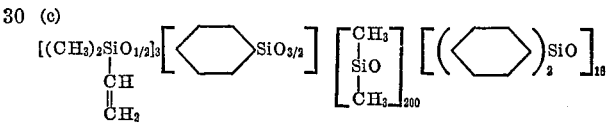

plus tertiary butyl peroxide as a curing catalyst. Cures on heating in $N_2$.

(d) 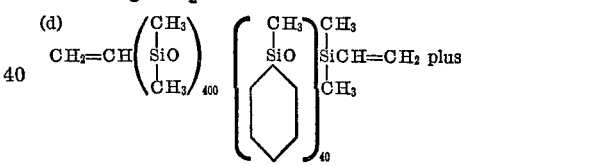

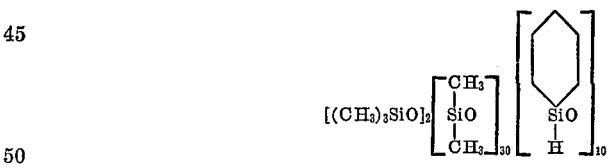

plus chloroplatinic acid as a curing catalyst. Cures on heating.

A preferred embodiment of this invention is an intermediate-range release agent consisting essentially of a mixture of:

(a) 97 parts by weight of a diorganopolysiloxane gum consisting essentially of ($R_2SiO$) units where R is selected from the group consisting of methyl and phenyl, from 83 to 96.5 mol percent of said R groups being methyl, and containing an average of at least two silicon-bonded —OM or hydroxyl groups per molecule, where M is an alkali metal, the viscosity of said gum at 25° C. being at least 5,000 cs., and from 1.5 to 5.0 parts by weight of an organosilicon fluid consisting essentially of (CH$_3$SiO)
 |
 H units, (b) From 1 to 3 parts by weight of finely-divided silica having a surface area of at least 100 square meters per gram, (c) From 200 to 2,000 parts by weight of a volatile, organic solvent, and (d) A catalytic amount of a silanol condensation catalyst.

M can be any alkali metal atom, e.g. sodium, potassium, or rubidium.

The term "consisting essentially of" is meant to imply that minor amounts of other materials such as catalysts, additives, and other siloxane units in the ingredient polymers can be included in the compositions of this invention without departing from the scope of the claims of this application. Examples of such other materials can be seen above.

The finely-divided silica is often useful to stabilize the release agent so that the release characteristics do not change with time. The silica is best used when ingredient (a) contains —OM groups, which are defined above.

It is often desirable for a silanol condensation catalyst to be present in those compositions of this invention which are cured by the condensation of silanol groups with themselves or with hydrolyzable groups such as silicon-bonded hydrogen or alkoxide groups, e.g. methoxide. Many such catalysts are known to the art.

Desirable catalysts are primary, secondary, and tertiary amines, preferably having a dissociation constant of at least $10^{-10}$, such as sec-butylamine, hydrazine, t-octylamine, dimethylaminomethylphenol, ethylenediamine, quinine, arginine, o-methoxybenzylamine, triethylamine, aniline, and pyridine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, alpha,beta-dimethylacrolein and amylamine, butyraldehyde and butylamine, acrolein and allylamine, and formaldehyde and heptylamine.

Another class of catalysts for the reaction is the carboxylic acid salts of metals higher than hydrogen in the electromotive force series of metals. Specific examples of the metals that can be used are lead, tin, nickel, cobalt, iron, cadmium, chromium, zinc, manganese, aluminum, magnesium, barium, strontium, calcium, cesium, rubidium, potassium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate, potassium acetate, chromium octoate; salts of polycarboxylic acids such as dibutyltin adipate and lead sebacate; and salts of hydroxy carboxylic acids such as dibutyltin dilactate.

The titanate esters, e.g. tetrabutyl titanate, and derivatives thereof are also operative in this invention, although they have been found to affect the release properties of the compositions to which they are added. They are, therefore, not preferred.

Strong alkali catalysts such as sodium hydroxide, potassium silanolate, potassium ethoxide, and tetrabutylammonium hydroxide are also operative, but they yield a product to that has non-uniform release properties unless they are neutralized.

Buffered alkali catalysts such as sodium or potassium phenoxide operate in this invention.

A normal catalytic amount of silanol condensation catalyst is used in this invention. This is frequently from 0.1 to 4 weight percent of catalyst, based on the weight of the other ingredients, but the range of catalyst concentration is not critical.

The "dispersing agent" can be water, with which an emulsion of the release agent can be formed, but it is generally preferable to use a volatile solvent such as xylene, toluene, perchloroethylene, heptane, dipropylether, or cyclohexane to disperse the mixture of this invention. It is usually preferred for no more than 95 weight percent of the composition of this invention to be dispersing agent. The release agents of this invention are generally used at a concentration of 85 to 93 weight percent of dispersing agent, although other concentrations are usable.

The methods of curing the compositions of this invention vary, but they are generally heated at a temperature of 100° to 200° C. for about 2 through 10 minutes after they have been applied to the substrate on which they are to reside. A good cure is usually obtained by the above treatment, but other curing temperatures and times can be operative.

The release capabilty of the compositions of this invention varies inversely with the amount of phenyl groups present in the silicone polymer. A high concentration of phenyl groups results in a more difficult release than a low phenyl concentration and a correspondingly high methyl concentration.

This principle can be utilized by using two organopolysiloxane gums, one with a high phenyl content and one with a low phenyl content, in the release agents of this invention. The degree of release obtained is dependent on the average phenyl content of the two gums, and this is controllable by controlling the ratio of the high phenyl content gum to the low phenyl content gum.

By this simple technique, release agents of any desired release capability can be quickly and easily formulated.

A preferred release agent of this invention is an intermediate-range release agent consisting essentially of a mixture of (a) A total of 97 parts by weight of a mixture of two diorganopolysiloxane gums each consisting essentially of ($R_2SiO$) units, where R is seelcted from the group consisting of methyl and phenyl, from 95 to 97 mol percent of said R groups being methyl in the case of one of said gums, and from 80 to 90 mol percent of said R groups being methyl in the case of the other of said gums, both of said gums containing an average of at least 2 silicon-bonded —OM or hydroxyl groups per molecule, where M is an alkali metal, the viscosity of said mixture at 25° C. being at least 5,000 cs., and from 1.5 to 5.0 parts by weight of an organosilicon fluid consisting essentially of

units, (b) From 1 to 3 parts by weight of finely-divided silica having a surface area of at least 150 square meters per gram, (c) From 200 to 2,000 parts by weight of a volatile, organic solvent, and (d) A catalytic amount of a silanol condensation catalyst.

One desirable embodiment of this invention results when the R groups of the above two organopolysilioxane gums are from 95.5 to 96.5 mol percent methyl and from 84 to 86 mol percent methyl respectively. By varying the ratio of these two gums in the formulation described immediately above, release agents having a broad range of release capabilities can be obtained. From this one system, release agents for many different uses can be prepared.

The release agents of this invention can be used on any substrate, e.g., glass, stone, plastic, rubber, metal, wood, and paper. They will give release against virtually all adhesives and sticky materials such as tar, pitch, raw rubber, and synthetic pressure sensitive adhesives.

It is preferred to use the compositions of this invention on substrates which are cellulosic sheets, e.g. corrugated paper, kraft paper, cardboard, cellulose acetate sheets, wrapping paper, and cotton fabric.

The following examples are illustrative only and should not be construed as limiting the invention, which is properly delineated in the appended claims.

EXAMPLE 1

A dimethylsiloxane copolymer gum which contained 7.5 mol percent of phenylmethylsiloxane units and which had a viscosity at 25° C. of 8,300 cs., was prepared by polymerizing an appropriate mixture of cyclic siloxanes in the presence of potassium dimethylsilanolate, which was present in the amount of one potassium atom per 10,000 silicon atoms.

(a) To 29.1 parts by weight of this gum there was added 0.9 part of

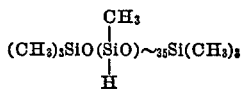

0.29 part of silica powder having a surface area of about 200 square meters per gram, 0.52 part of dibutyltin dilaurate, and 270 parts of xylene.

This composition was coated on glassine paper by drawdown with a No. 14 Mayer rod. The coated paper was cured for 2 minutes at 250° F.

One inch wide strips of Johnson and Johnson adhesive tape were firmly affixed to the coated side of the paper. The force required to remove the tape by pulling it backwards along itself, parallel to the plane of the paper, was measured on a Keil tester in accordance with T.A.P.P.I.—R.C. Test No. 283.

The results were:

| | G. |
|---|---|
| Initial | 41 |
| After allowing the tape to stay on the paper for 7 days | 51 |
| After allowing the tape to stay on the paper for 60 days | 33 |

(b) The composition of (a) was remade, using a similar copolymer gum having a viscosity at 25° C. of 8,150 cs., and using 0.58 part of the silica ingredient.

The composition was applied to paper, cured, and tested as in (a) above.

The results were:

| | G. |
|---|---|
| Initial | 36 |
| After allowing the tape to stay on the paper for 7 days | 42 |
| After allowing the tape to stay on the paper for 60 days | 35 |

(c) The composition of (a) above was remade into a known release agent by using as the organopolysiloxane gum a dimethylpolysiloxane having a viscosity at 25° C. of about 8,000 cs., the gum having been polymerized in the presence of potassium dimethylsilanolate.

The composition was applied to paper, cured, and tested as in (a) above.

The results were:

| | G. |
|---|---|
| Initial | 10 |
| After allowing the tape to stay on the paper for 7 days | 14 |
| After allowing the tape to stay on the paper for 60 days | 10 |

EXAMPLE 2

To 9.7 parts by weight of a dimethylpolysiloxane copolymer gum containing 13 mol percent of phenylmethylsiloxane units, the gum having been copolymerized from cyclic polysiloxanes to a viscosity of about 9,000 cs. at 25° C. in the presence of potassium dimethylsilanolate, there was added 0.3 part of

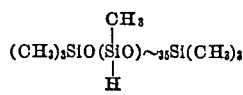

90 parts of xylene, and 1 part of stannous octoate as a condensation catalyst.

This solution was applied to the surface of glassine paper using drawdown with a No. 14 Mayer rod. The coated paper was cured for 2 minutes at 250° F.

The coated paper was tested with the Keil tester as in Example 1 to yield an initial release value of 88 g.

EXAMPLE 3

The experiment of Example 2 was repeated, substituting for the copolymer gum of Example 2 a copolymer gum of 70 mol percent of dimethylsiloxane units and 30 mol percent of phenylmethylsiloxane units, having a viscosity at 25° C. of about 8,000 cs. and having been copolymerized from cyclic polysiloxanes in the presence of potassium dimethylsilanolate.

The initial release value was 111 g., when tested as in Example 1.

EXAMPLE 4

The experiment of Example 2 was repeated, substituting for the copolymer gum of Example 2 a copolymer gum of 94.5 mol percent of dimethylsiloxane and 5.5 mole percent of diphenylsiloxane, having a viscosity at 25° C. of about 8,000 cs. and having been prepared in the presence of potassium dimethylsilanolate.

The initial release value was 52 g. The release value after the tape had remained on the treated paper for 30 days was 42 g.

EXAMPLE 5

When a mixture of 5 parts by weight of an organopolysiloxane gum of the formula

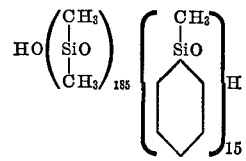

5 parts of a gum of the formula

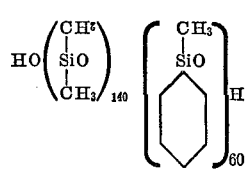

0.3 part of

cyclic tetramer, 0.3 part of powdered silica having a surface area of about 400 square meters per gram, 0.2 part of stannous octoate, and 1,000 parts of perchloroethylene are applied to kraft paper and cured for 3 minutes at 220° F., the coated paper exhibits moderate release characteristics toward adhesive tape, asphalt, and other sticky materials.

That which is claimed is:

1. An intermediate-range release agent consisting essentially of a mixture of
   (a) 97 parts by weight of a diorganopolysiloxane gum consisting essentially of (R₂SiO) units, where R is selected from the group consisting of methyl and phenyl, from 83 to 96.5 mol percent of said R groups being methyl, and containing an average of at least two silicon-bonded —OM or hydroxyl groups per molecule, where M is an alkali metal, the viscosity of said gum at 25° C. being at least 5,000 cs., and from 1.5 to 5.0 parts by weight of an organosilicon fluid consisting essentially of

units, (b) from 1 to 3 parts by weight of finely-divided silica having a surface area of at least 150 square meters per gram, (c) from 200 to 2,000 parts by weight of a volatile, organic solvent, and (d) a catalytic amount of a silanol condensation catalyst.

2. A cellulosic sheet, coated with the cured composition of claim 1.

3. The composition of claim 1 where the organic solvent is xylene.

4. The composition of claim 1 where the organic solvent is perchloroethylene.

5. The method of coating a cellulosic sheet comprising treating the surface of said sheet with a release agent consisting essentially of a mixture of (a) 97 parts by weight of a diorganopolysiloxane gum consisting essentially of ($R_2SiO$) units, where R is selected from the group consisting of methyl and phenyl, from 83 to 96.5 mol percent of said R groups being methyl, and containing an average of at least two silicon-bonded —OM or hydroxyl groups per molecule, where M is an alkali metal, the viscosity of said gum at 25° C. being at least 5,000 cs., and from 1.5 to 5.0 parts by weight of an organosilicon fluid consisting essentially of $$\begin{array}{c}(CH_3SiO)\\|\\H\end{array}$$

units, (b) from 1 to 3 parts by weight of finely-divided silica having a surface area of at least 150 square meters per gram, (c) from 200 to 2,000 parts by weight of a volatile, organic solvent, (d) a catalytic amount of a silanol condensation catalyst, and heating said treated cellulosic sheet to cure said release agent.

References Cited

UNITED STATES PATENTS 2,708,289   5/1955   Collings _____ 260—46.5
3,328,482   6/1967   Worthrup _____ 260—825

MORRIS LIEBMAN, *Primary Examiner.*

L. T. JACOBS, *Assistant Examiner.*

U.S. Cl. X.R.

260—33.8, 37